(12) United States Patent
Becker et al.

(10) Patent No.: US 10,784,954 B2
(45) Date of Patent: Sep. 22, 2020

(54) DYNAMIC SATELLITE BEAM ASSIGNMENT

(71) Applicant: VIASAT, INC., Carlsbad, CA (US)

(72) Inventors: Donald Becker, Rancho Santa Fe, CA (US); James Petranovich, La Jolla, CA (US); Remberto Martin, Centennial, CO (US)

(73) Assignee: VIASAT, Inc., Carlsbad, CA (US)

( * ) Notice: Subject to any disclaimer, the term of this patent is extended or adjusted under 35 U.S.C. 154(b) by 0 days.

(21) Appl. No.: 16/489,332

(22) PCT Filed: Mar. 1, 2018

(86) PCT No.: PCT/US2018/020461
§ 371 (c)(1),
(2) Date: Aug. 27, 2019

(87) PCT Pub. No.: WO2018/160842
PCT Pub. Date: Sep. 7, 2018

(65) Prior Publication Data
US 2020/0007227 A1      Jan. 2, 2020

Related U.S. Application Data

(60) Provisional application No. 62/465,987, filed on Mar. 2, 2017.

(51) Int. Cl.
*H04B 7/204* (2006.01)
*H04B 7/185* (2006.01)
(Continued)

(52) U.S. Cl.
CPC ......... *H04B 7/2041* (2013.01); *H04B 7/0408* (2013.01); *H04B 7/18515* (2013.01);
(Continued)

(58) Field of Classification Search
CPC ........ H04B 7/185; H04B 7/19; H04B 7/2041; H04B 7/309; H04B 7/0408; H04B 7/18515; H04B 7/18541; H04B 7/18543
See application file for complete search history.

(56) References Cited

U.S. PATENT DOCUMENTS 5,809,397 A   9/1998   Harthcock et al.
6,017,003 A   1/2000   Mullins
(Continued)

FOREIGN PATENT DOCUMENTS

EP    0998060 A2      5/2000
GB    2318947 A       5/1998
KR    2011-0076221 A  7/2011

OTHER PUBLICATIONS

International Search Report and Written Opinion dated Apr. 24, 2018 in International Patent Application No. PCT/US2018/020461, filed Mar. 1, 2018, 9 pages.

(Continued)

*Primary Examiner* — Dong-Chang Shiue
(74) *Attorney, Agent, or Firm* — Kilpatrick Townsend & Stockton, LLP

(57) ABSTRACT

Embodiments provide techniques for dynamic spot beam assignment in a geostationary satellite communications network. For example, a ground processing node in the geostationary satellite network can monitor spot beam coverage area location and can detect a beam drift trigger indicating present drifting of one or more coverage areas. Ground terminals can be identified as serviced by spot beams associated with the drifting coverage area(s) and as experiencing a signal quality impact from the drifting. The ground terminal node can compute an update to a beam assignment map having a reassignment of the identified user terminals from their presently servicing spot beams to another of the spot beams in a manner that seeks to address at least some (Continued)

of the signal quality impact identified as associated with the drifting. Some embodiments further account for load balancing, and/or other factors, and/or can maintain stateful communications between the reassigned user terminals and the geostationary satellite.

27 Claims, 5 Drawing Sheets

(51) Int. Cl.
*H04B 17/309* (2015.01)
*H04B 7/0408* (2017.01)
*H04B 7/19* (2006.01)

(52) U.S. Cl.
CPC ..... *H04B 7/18541* (2013.01); *H04B 7/18543* (2013.01); *H04B 7/19* (2013.01); *H04B 17/309* (2015.01)

(56) References Cited

U.S. PATENT DOCUMENTS

| | | | |
|---|---|---|---|
| 6,157,621 A | 12/2000 | Brown et al. | |
| 6,804,521 B2 | 10/2004 | Tong et al. | |
| 6,892,068 B2 | 5/2005 | Karabinis et al. | |
| 7,062,267 B2 | 6/2006 | Karabinis | |
| 7,970,345 B2 | 6/2011 | Cummiskey et al. | |
| 8,149,761 B2 | 4/2012 | Hudson et al. | |
| 8,160,530 B2 | 4/2012 | Corman et al. | |
| 8,265,646 B2 | 9/2012 | Agarwal | |
| 8,655,410 B2 | 2/2014 | Senarath et al. | |
| 8,995,943 B2 | 3/2015 | Corman et al. | |
| 9,425,890 B2 | 8/2016 | Corman et al. | |
| 9,843,107 B2 | 12/2017 | Corman et al. | |
| 9,912,399 B2 | 3/2018 | Dankberg | |
| 10,305,199 B2 | 5/2019 | Corman et al. | |
| 2004/0002203 A1 | 1/2004 | Deshpande et al. | |
| 2006/0194381 A1 | 8/2006 | Wei et al. | |
| 2012/0243465 A1* | 9/2012 | Wohlford | H04B 7/2606 370/316 |
| 2014/0022120 A1* | 1/2014 | Mendelsohn | H04B 7/2041 342/355 |
| 2015/0200107 A1 | 7/2015 | Cheng et al. | |
| 2015/0279726 A1 | 10/2015 | Ren et al. | |
| 2016/0323800 A1* | 11/2016 | Ulupinar | H04W 72/048 |

OTHER PUBLICATIONS

International Preliminary Report on Patentability dated Sep. 3, 2019 in International Patent Application No. PCT/US2018/020461, filed Mar. 1, 2018, 7 pages.
International Search Report and Written Opinion dated Dec. 22, 2017 in International Patent Application No. PCT/US2017/025498, filed Mar. 31, 2017, 9 pages.
International Preliminary Report on Patentability dated Oct. 1, 2019 in International Patent Application No. PCT/US2017/025498, filed Mar. 31, 2017, 7 pages.
Thompson, P., et al. "Concepts and Technologies for a Terabit/s Satellite, Supporting future broadband services via satellite", SPACOMM: The Third International Conference on Advances in Satellite and Space Communications, 2011, 8 pages.

* cited by examiner

DYNAMIC SATELLITE BEAM ASSIGNMENT

FIELD

Embodiments relate generally to geostationary satellite communications systems, and, more particularly, to dynamic assignment of ground terminals to satellite fixed spot beams.

BACKGROUND

In geostationary satellite communications systems, data can be communicated between ground terminals (e.g., satellite access nodes and user terminals) via a satellite. To provide communications services to large numbers of ground terminals spread over a large geographical area, the area can typically be segmented into smaller coverage areas. For example, a geographical area can be segmented into a hexagonal array, and some or all of the hexagons can be illuminated by respective spot beams to service the ground terminals in those hexagonal regions. Though each spot beam can be pointed to illuminate a particular coverage area, the coverage areas of the spot beams can drift from their nominal positions over time due to deflections of satellite reflectors, changes in satellite attitude, and/or other real-world factors.

As spot beam coverage areas shrink (e.g., for high-throughput satellites), such drifting can have a greater impact on reliable provision of satellite communications services. One reason is that smaller spot beams are typically produced using larger satellite apertures (e.g., larger reflectors), and those larger physical features of the satellite can be more prone to deflection. Another reason is that, with smaller spot beam coverage areas, more ground terminals will tend to be near the edge of a coverage area (away from the center of the beam), so that drifting of the coverage area can tend to impact quality of service for more ground terminals. Some conventional approaches attempt to provide more accurate satellite pointing (e.g., using active on-board attitude control, ground assist autopointing, and the like). However, such approaches can tend to consume appreciable fuel and may not account for deflection of reflectors and other related concerns. Other conventional approaches use mechanical beam steering, digital beamforming, and/or other techniques to maintain desired beam pointing. However, such approaches can tend to increase cost, complexity, and weight of the satellite.

BRIEF SUMMARY

Among other things, systems and methods are described for providing dynamic spot beam assignment in a geostationary satellite communications network. For example, a ground processing node in communication with ground terminals can monitor spot beam coverage area location and can detect a beam drift trigger indicating a present drifting of one or more coverage areas. A set of ground terminals can be identified (e.g., according to a beam assignment map) as serviced by spot beams associated with the drifting coverage area(s) and as experiencing a signal quality impact from the drifting. The ground terminal node can compute an update to a beam assignment map having a reassignment of the identified ground terminals from their presently servicing spot beams to another of the spot beams. Computation of the updated beam assignment map can seek to address at least some of the signal quality impact identified as associated with the drifting. In some embodiments, computation of the updated beam assignment map can account for load balancing, and/or other factors. Messages can be communicated from the ground processing node to the identified ground terminals (e.g., via the satellite and one or more gateway terminals) directing the ground terminals to adjust according to the updated beam assignment map. The dynamic beam assignment can be performed in a manner that maintains stateful communications between the reassigned ground terminals and the satellite.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
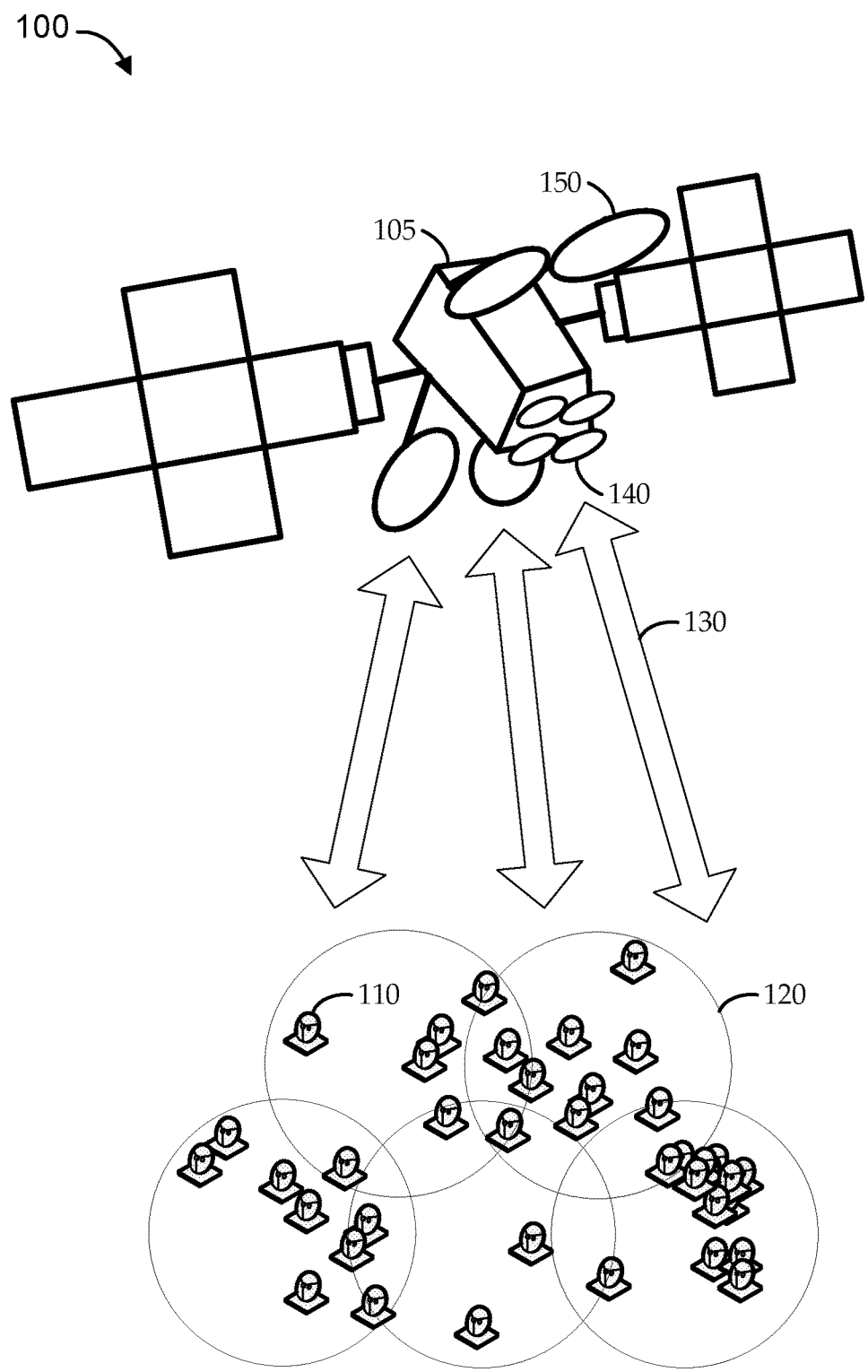
FIG. 1 shows an illustrative geostationary satellite communications system, as a context for various embodiments.

FIG. 1 shows an illustrative geostationary satellite communications system 100, as a context for various embodiments. As illustrated, a geostationary satellite 105 is in communication with a number of ground terminals 110. The ground terminals 110 can include user terminals and gateway terminals. In some embodiments, the ground terminals 110 are stationary. In some embodiments, the satellite 105 is a bent-pipe satellite. In some embodiments, the satellite 105 and ground terminals 110 can implement a hub-and-spoke communications architecture, whereby user terminals communicate with each other and with other communications networks through gateway terminals. For example, forward communications are from gateway terminals to user terminals via the satellite 105, and return communications are from user terminals to gateway terminals via the satellite 105; and user terminals do not communicate directly with other user terminals via the satellite 105. In other embodiments, the satellite communications system 100 can be architected as a mesh network, a peer-to-peer network, or according to any other suitable architecture.

The satellite 105 can communicate with the ground terminals 110 by illuminating beam coverage areas 120 with spot beams 130. For example, to provide communications services to large numbers of ground terminals 110 spread over a large geographical area, the geographical area can typically be segmented into smaller coverage areas 120, and those coverage areas 120 can be serviced by spot beams 130. A spot beam 130 is a satellite beam focused on a limited geographic region of the Earth. Satellite feeds can be used to produce the spot beams 130, and ground terminals 110 disposed within the geographic region illuminated by the spot beam 130 can communicate with the satellite 105 via those feeds. As used herein, a coverage area 120 for a particular spot beam 130 generally refers to a limited geographic region of the Earth in which a ground terminal can be provided at least a predetermined minimum level of signal quality via the spot beam 130. For example, a coverage area 120 for a spot beam 130 can be defined according to a 3 dB (or other suitable value) cross-section of the antenna pattern of the spot beam 130, such that ground terminals within that coverage area 120 are expected to see a signal strength that is within 3 dB of the peak signal strength over the spot beam 130. As another example, a coverage area 120 for a spot beam 130 can be defined according to a carrier-to-interference (C/I) ratio that is a predetermined amount below the peak within the coverage area 120 (e.g., a maximum C/I at the center of the spot beam 130).

The ground terminals 110 can include equipment that permits communication with the satellite 105 via the various spot beams 130, and can be located within the coverage area 120 of at least one spot beam 130. Each ground terminal 110 can be assigned a particular spot beam 130 and include equipment (e.g., an antenna, transceiver, etc.) that can be configured for communication via that assigned spot beam 130. The equipment of each ground terminal 110 can, in response to a reassignment message, also be automatically reconfigured for communication with a newly assigned spot beam 130 that can have different beam characteristics (e.g., carrier frequency, polarization, etc.) than the previously assigned spot beam 130. Configuring and reconfiguring the equipment of the ground terminal 110 to can include updating one or more communications settings of the equipment in order to transmit and receive modulated data via the assigned spot beam 130. The communication settings can, for example, one or more of: a particular carrier frequency, a particular polarization orientation, particular packet information (e.g., implemented as a preamble, post-amble, mid-amble, or in any other suitable manner), particular modulation and/or coding schemes, etc. Typically, the satellite 105 can illuminate a broad geographic region of the Earth using a large number of spot beams 130, and the satellite 105 can maintain a consistent position (e.g., orbital slot) relative to the Earth by maintaining a geostationary orbit. Even though the satellite 105 position can be closely maintained, spot beam 130 pointing errors can result from even small variations in factors, such as satellite attitude, reflector deflection, thermal gradients, thruster firings, and other satellite maneuvering.

Satellite antennas with higher directionality and larger apertures can be used to produce narrower spot beams 130 illuminating smaller respective coverage areas 120. Narrower spot beams 130 can provide higher gain per spot beam 130, which can produce better signal-to-noise (SNR) ratio at the user terminals and can allow for higher rates of data transfer between the satellite 105 and the ground terminals 110. Also, narrower spot beams 130 can allow for greater frequency reuse, which can provide even greater increases in data throughput of a satellite communications system 100. However, coverage areas 120 of the spot beams 130 can drift from their nominal location over time, and the drifting can have a greater service impact in the context of narrower spot beams 130.

For example, as illustrated, the satellite 105 can include various physical features used to produce spot beams 130, such as feed structures 140 and reflector structures 150. Movement of the satellite 105 and/or these features within even a few thousandths of a degree (e.g., due to deflections of reflectors 150, changes in satellite 105 attitude, etc.) can cause appreciable drift in the geographic area covered by spot beams 130. A single satellite reflector 150 is often used to produce a large number of spot beams 130, such that slight deflection of that single reflector 150 can cause many coverage areas 120 concurrently to drift. Further, satellites 105 having multiple reflectors 150 can experience different deflection for each reflector 150, causing even adjacent coverage areas 120 on the ground potentially to drift in different directions and/or by different amounts. Narrower spot beams 130 are typically produced using larger reflectors 150, and the larger reflectors 150 tend to be more prone to deflection. Further, with smaller spot beam coverage areas 120, more ground terminals 110 will tend to be near the edges of coverage areas 120 (away from the center of the spot beam 130), so that coverage area 120 drifting can be more likely to degrade service for more ground terminals 110.

Some conventional approaches attempt to provide more accurate satellite 105 pointing. However, such approaches can tend to consume appreciable amounts of fuel and may not account for deflection of reflectors 150, and the like. Other conventional approaches use mechanical beam steering, digital beamforming, and/or other techniques to maintain desired spot beam 130 pointing. However, such approaches can tend to increase cost, complexity, and weight of the satellite 105.

Embodiments described herein include a novel approach to maintaining quality of service to ground terminals in context of coverage area 120 drift by detecting degradation of signal quality resulting from such drift and dynamically reassigning ground terminals to spot beams 130 in a manner that counteracts the degradation. The geostationary satellite communications system 100 can include one or more ground processing nodes (not shown in FIG. 1). In some embodiments, the ground processing node(s) can be within a ground network in communication with some of the ground terminals 110 (e.g., gateway terminals), such as co-located or integrated within one or more core nodes, network operations centers (NOCs), etc. In some embodiments, the ground processing node(s) can be co-located or integrated within one or more gateway terminals. As described in more detail below, the ground processing node(s) can use link measurement data that indicates signal quality (e.g., signal strength, signal-to-noise ratio, carrier-to-interference ratio, carrier-to-interference-plus-noise ratio, packet error and/or loss data, etc.) at locations within the coverage areas 120 illuminated by the spot beams 130 to detect a beam drift trigger indicating a present drifting of one or more coverage areas 120 of one or more spot beams 130. As used herein, link measurement data generally refers to a collection of measured data of one or more signals communicated via the spot beams between the satellite and the ground terminals that indicates signal quality at the locations of those ground terminals. A set of ground terminals can be identified as presently assigned to the drifting spot beam(s) and as experiencing a signal quality degradation from the present drifting. The ground processing node(s) can compute, in response to the beam drift trigger, an updated beam assignment map that at least partially counteracts the signal quality degradation by reassigning each of the set of ground terminals from their respective presently assigned spot beams 130 to others of the spot beams 130. In embodiments in which the ground terminals include user terminals, reassignment messages can be communicated via the satellite 105 (e.g., from the ground processing node(s) via the gateway terminals) to the affected user terminals indicating updated spot beam 130 assignments according to the computed beam assignment map. The user terminals can update their communications settings (e.g., carrier frequency, polarization orientation, communication time slots, modulation and/or coding scheme, beam identifier, and/or other settings) of their equipment to effectuate communications with the newly assigned spot beam 130 according to the updated beam assignment map. In embodiments in which the ground terminals include gateway terminals, reassignment messages can be communicated to the affected gateway terminals via the ground network and/or via the satellite 105. The affected gateway terminals can then update their communication settings of their equipment to effectuate communications with the newly assigned spot beam 130. As described herein, embodiments can effectuate the beam reassignment in a manner that maintains stateful communications between the reassigned ground terminals and the satellite. For example, conventional beam assignment can involve assigning a new Internet protocol (IP) address, tearing down and reestablishing socket connections, etc. As described herein, the beam reassignment can be implemented in such a way that current browsing sessions, media streaming, and/or other network transactions are not interrupted (e.g., using protocols like mobile IP, proxy servers, and similar techniques).

Figure 2:
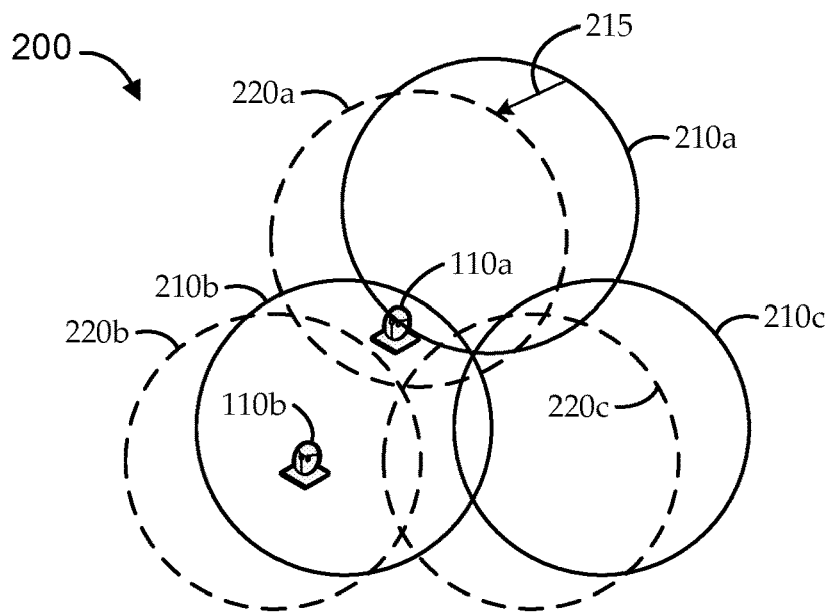
FIG. 2 shows an illustrative geographic area serviced by multiple, overlapping spot beam coverage areas.

FIG. 2 shows an illustrative geographic area 200 serviced by multiple, overlapping spot beam coverage areas. For the sake of clarity, only three coverage areas and two ground terminals 110 are shown. In the following discussion, the two ground terminals 110 of FIG. 2 are user terminals. Solid lines are used to show initial locations 210 of the coverage areas at a first time, and dashed lines are used to show drifted locations 220 of the coverage areas at a second time. For example, deflection of a satellite reflector used to produce the spot beams associated with the coverage areas causes a first coverage area of a first spot beam to drift from its initial location 210a to a respective drifted location 220a. The direction and amount of drift is illustrated by arrow 215.

As illustrated, at the first time, a first user terminal 110a is located just outside a first coverage area initial location 210a of the first spot beam and within a second coverage area initial location 210b of a second spot beam. Accordingly, the first user terminal 110a may be presently assigned to the second spot beam illuminating the second coverage area initial location 210b. After some time, the first coverage area of the first spot beam drifts to its drifted location 220a, and the second coverage area of the second spot beam drifts to its drifted location 220b. After the drift, the first user terminal 110a is located just outside the second drifted coverage area 220b and within the first drifted coverage area 220a. Accordingly, the first user terminal 110a may experience degraded service via the second spot beam to which it is presently assigned. Embodiments can detect the drift (e.g., and/or the service degradation), can determine that reassignment of the first user terminal 110a to the first spot beam illuminating the first drifted coverage area 220a would provide improved service to the user terminal 110a, and can instruct the first user terminal 110a to adjust its communications settings to begin communicating via the first spot beam to which it has been reassigned.

Figure 3:
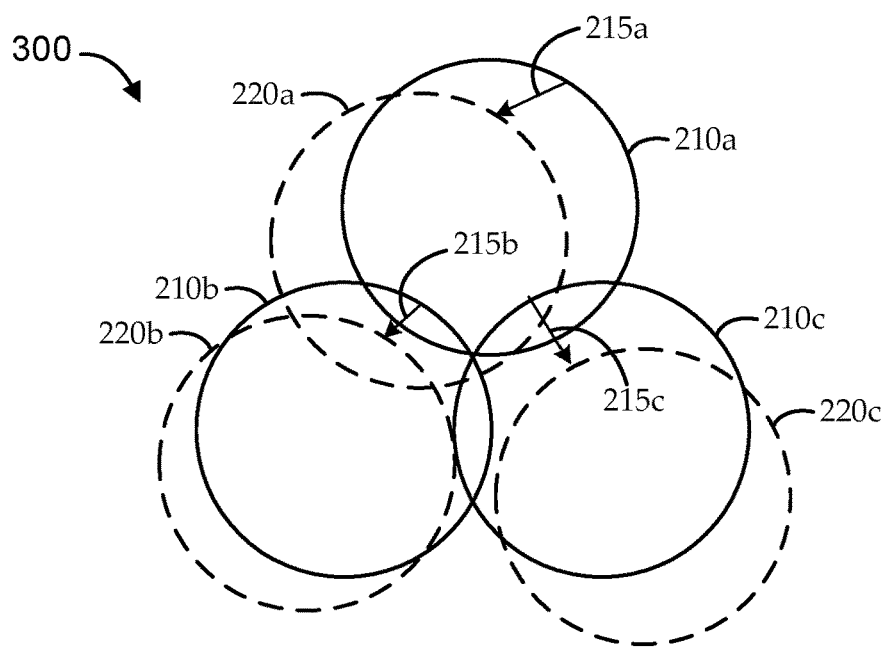
FIG. 3 shows another illustrative geographic area serviced by multiple, overlapping spot beam coverage areas.

FIG. 3 shows another illustrative geographic area 300 serviced by multiple, overlapping spot beam coverage areas. As described above, a satellite can include one or more reflectors. It can be assumed that, in FIG. 2, the illustrated coverage areas are all illuminated by spot beams produced using the same reflector, and the drift is shown as relatively consistent among the different coverage areas. In FIG. 3, each of the illustrated coverage areas is illuminated by a spot beam produced using a different reflector (i.e., the satellite includes at least three reflectors). Deflection of each reflector causes its associated spot beam coverage areas to drift, and the respective drift of the each coverage area can be independent of, and different from, the drift of the other coverage areas, as indicated by arrows 215. For example, some embodiments can use different reflectors to produce adjacent spot beams of different polarization orientation, color, etc., which can provide interference mitigation. As such, adjacent coverage areas may drift differently. Further, in some embodiments, each reflector of a multi-reflector satellite can illuminate a large group of spot beams spread over a large geographic area, and the coverage areas of each group of spot beams can drift in a manner that is consistent among the spot beams within the group, even if different from the drifting of other coverage areas of other spot beam groups. In such cases, certain conventional approaches can be ineffective. For example, adjusting the azimuth and/or elevation of the satellite may help correct drift in some coverage areas, while exacerbating drift in other coverage areas. Some embodiments described herein can address and/or exploit these and other features of spot beam production, for example, by computing beam assignments globally across large numbers of spot beams.

As described above, embodiments detect a beam drift trigger that indicates present drifting of one or more spot beam coverage areas. Some embodiments can measure the drift based on the link measurement data at locations of a subset of ground terminals and can predict, according to the drift, which additional ground terminals are likely experiencing a degradation in signal quality due to the drift. Other embodiments can measure the drift based on the link measurement data at locations of each of a set of ground terminals and directly identify which user terminals within that set are experiencing degradation in signal quality. The manner in which the signal quality is measured at the locations of ground terminals can vary from embodiment to embodiment. For example, according to one embodiment, ground terminals can receive downlink messages (e.g., management messages) from the satellite and can track the strength of those messages and/or other information contained in those messages to monitor their signal quality over time. The ground terminals can communicate information indicating their signal quality back to one or more ground processing nodes (e.g., via the satellite), and the information can be collected to generate the link measurement data used to monitor drift. According to another example, the satellite can illuminate narrow spot beams and one or more wide area beams. Ground terminals can measure the signal strength of downlink signals received via the spot beams as compared to signal strength of downlink signals received via the wide area beams to monitor their signal quality from the spot beams.

Figure 4A:
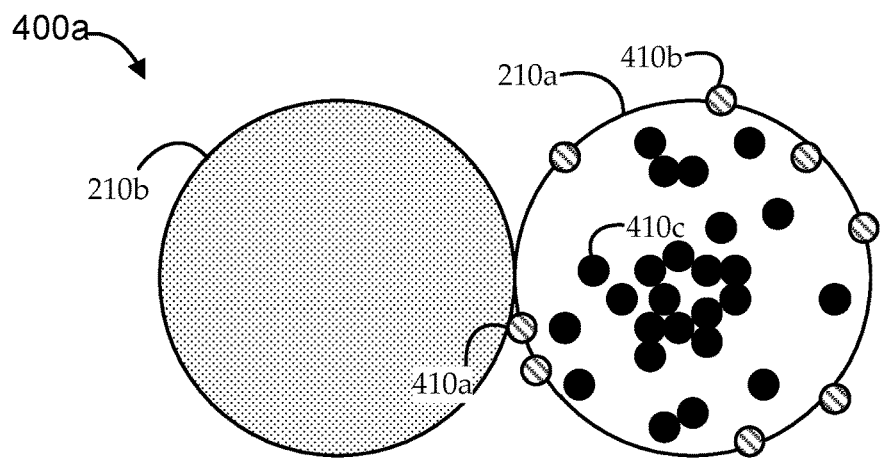
FIGS. 4A-4C show another illustrative geographic area serviced by multiple, overlapping spot beam coverage areas.
Figure 4B:
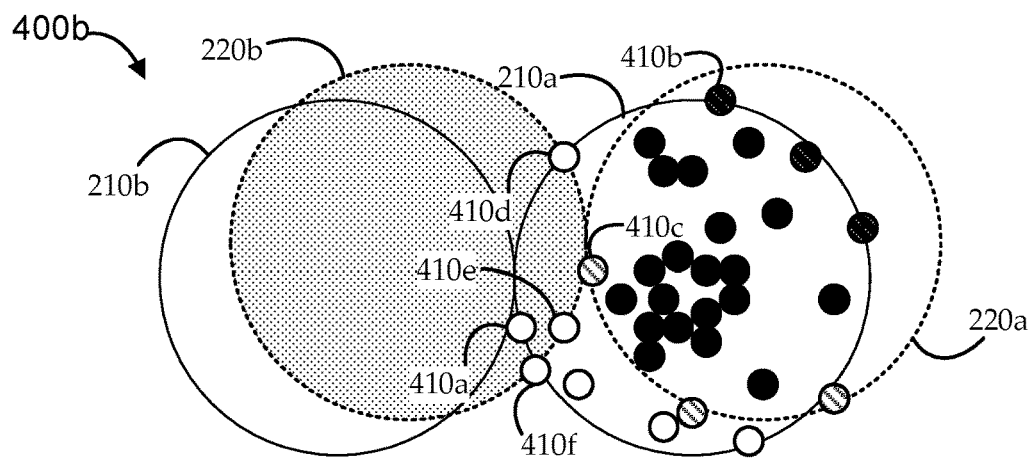
Figure 4C:
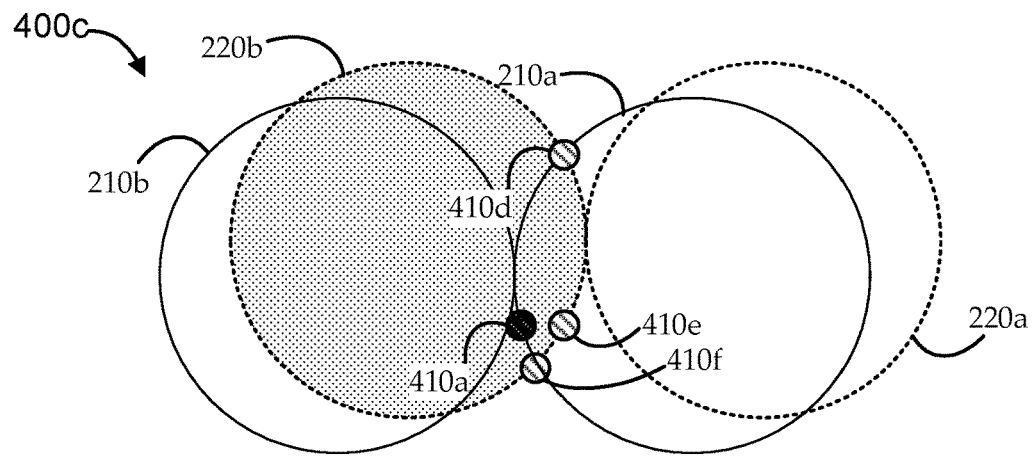

FIGS. 4A-4C show another illustrative geographic area 400 serviced by multiple, overlapping spot beam coverage areas. In the following discussion, the ground terminals 410 of FIGS. 4A-4C are user terminals. A group of user terminals 410 is shown located in an initial location 210a of a first coverage area of an assigned first spot beam. For the sake of clarity, only user terminals 410 initially assigned to the first spot beam are shown. User terminals 410 shown as black-filled circles indicate user terminals 410 located well within the coverage area and having good quality of service. User terminals 410 shown as pattern-filled circles indicate user terminals 410 located at the edge of the coverage area and having signal quality that is currently good, but susceptible to degradation with beam drift. User terminals 410 shown as white-filled circles (in FIG. 4B) indicate user terminals 410 located outside the coverage area of their assigned coverage areas 210 and currently having unacceptable signal quality.

As illustrated in FIG. 4A, at an initial time, two adjacent coverage areas are in their initial locations (210a, 210b); user terminal 410c is well within the first coverage area; and user terminals 410a and 410b are on the edge of the first coverage area. As illustrated in FIG. 4B, at a second time, the two adjacent coverage areas have drifted to respective drifted locations, 220a and 220b. Now, user terminal 410b is well within the first coverage area; user terminal 410c is on the edge of the first coverage area; and user terminal 410a (as well as other user terminals, such as 410d, 410e, and 410f) is completely outside the first coverage area. As illustrated in FIG. 4C, in response to the drifting of the coverage areas, at a third time, affected user terminals 410 can be reassigned to a second spot beam associated with the second coverage area. For the sake of clarity, only certain affected user terminals (410a, 410d, 410e, and 410f) are shown to illustrate reassignment of those user terminals 410 to the second coverage area of the second spot beam. Now, user terminal 410a is well within the second coverage area to which it has been reassigned; and user terminals 410d, 410e, and 410f are on the edge of the second coverage area to which they have been reassigned.

In such approaches, signal quality at the locations of some or all ground terminals can participate in detecting beam drift. In some embodiments, a present beam assignment map can be used to identify a sample subset of ground terminals across one or more coverage areas statistically likely to provide sufficient link measurement data to indicate beam drift. In other embodiments, ground terminals can be selected to participate based on geolocation data for the ground terminals with respect to coverage area locations. For example, global positioning satellite (GPS) data, account information (e.g., zip code data, address database data, etc.), and/or any other suitable data can be used to determine the geographic location of ground terminals. Certain ground terminals can then be selected, for example, as located within a certain distance of the edge of a coverage area, based on a certain distance from the center of a coverage area, etc.

Figure 5:
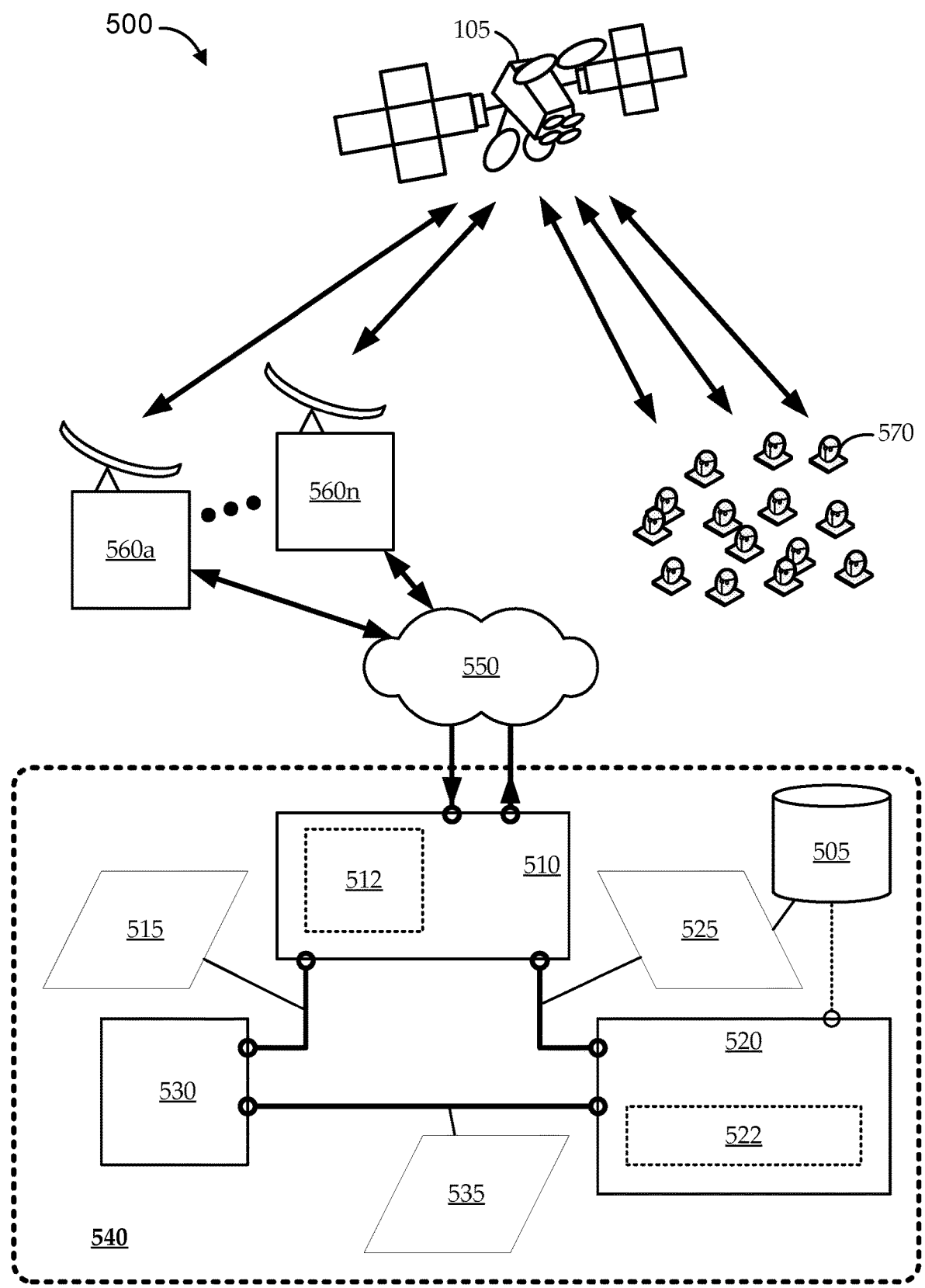
FIG. 5 shows a block diagram for an illustrative dynamic beam assignment system in a geostationary satellite communications network, according to various embodiments.

FIG. 5 shows a block diagram for an illustrative dynamic beam assignment system 500 in a geostationary satellite communications network, according to various embodiments. Multiple gateway terminals 560 can communicate with multiple user terminals 570 via satellite 105. For example, the user terminals 570 are located in user terminal coverage areas illuminated by spot beams of the satellite 105, and each user terminal 570 can be assigned at any particular time to communicate with the satellite 105 via a particular one of the spot beams. In some embodiments, the satellite 105 is a geostationary satellite 105, and the spot beams are fixed spot beams. As used herein, a fixed spot beam has a coverage area that illuminates a nominally fixed geographic location, such that any change in the fixed geographic location is caused by the beam drift. For example, any such change in the fixed geographic location of the coverage area of the fixed spot beam is not due to reconfiguration of the satellite, feeds and/or reflector (e.g., the fixed spot beam is not mechanically or digitally steerable). The gateway terminals 560 are in communication with one or more ground processing nodes via a ground network 550. For example, the ground network 550 can be any suitable network, such as a network that includes Internet backbone network infrastructure.

At least one of the ground processing nodes can include the illustrated ground processing node structure 540. Embodiments of the ground processing node structure 540 can include a data store 505 having a beam assignment map 525 stored thereon. The data store 505 can be implemented as one or more physical storage devices located within, or in communication with, other components of the ground processing node structure 540. The beam assignment map 525 can indicate a beam assignment for each (e.g., of some or all) user terminal 570 and gateway terminal 560. In the beam assignment map 525, the user terminals 570 and gateway terminals 560 can be identified in any suitable manner and can include any suitable information about the user terminals 570 and gateway terminals 560 respectively. For example, user terminals 570 and gateway terminals 560 can be associated with unique identifiers (e.g., a serial number, an index number, a media access control (MAC) address, etc.), location information (e.g., global positioning satellite (GPS) coordinates, a street address, etc.), etc. The beam assignment map 525 can also include any suitable information relating to the assignment of beams to user terminals 570 and gateway terminals 560. For example, the beam assignment map 525 can include information about a present beam assignment (e.g., a beam identifier for the presently assigned beam, a beam group associated with the presently assigned beam, etc.), communications settings (e.g., a present carrier frequency, polarization orientation, modulation and coding scheme, protocol information, etc.), information to assist with reassignment determinations (e.g., adjacent beams to the presently assigned beam, time elapsed since a last reassignment for that user terminal 570 or gateway terminal 560, etc.), etc. Some embodiments of the data store 505 (e.g., the beam assignment map 525 and/or other stored information) can include additional information relating to dynamic beam assignments. For example, embodiments can store information relating to thresholds (e.g., a programmable minimum signal strength measurement that triggers a beam reassignment, etc.), beam position data (e.g., a present map of coverage areas), beam loading information (e.g., present available capacity of beams, present and/or predicted demand for beam resources, etc.), beam grouping and/or dependency information (e.g., mappings between reflectors of the satellite 105 and the beams illuminated by those reflectors, beams grouped by user terminal 110 type or category, beams grouped by modulation and coding scheme, beams grouped by geographic region, etc.), etc.

Embodiments of the ground processing node structure 540 can include a beam tracking structure 530, a terminal assignment structure 520, and a communications interface structure 510. The communications interface structure 510 can include a network data input and a network data output that can be communicatively coupled with the satellite 105 via the ground network 550 and gateway terminals 560. For example, the communications interface structure 510 can include any suitable hardware and/or software for providing an interface between the ground network 550 and other components of the ground processing node structure 540. The beam tracking structure 530 can include a link measurement data input, which can be coupled with the communications interface structure 510, to receive the link measurement data described herein. The beam tracking structure 530 can also include a trigger signal output that includes (e.g., indicates) a beam drift trigger 535 when the link measurement data input indicates a present drifting of a coverage area illuminated by at least one of the spot beams of the satellite 105.

Embodiments include various techniques for determining when the link measurement data received via the link measurement data input indicates a present drifting of a coverage area illuminated by at least one of the spot beams of the satellite 105. Some embodiments determine drifting of a single beam coverage area, groups of beam coverage areas, all beam coverage areas associated with a particular reflector, all beam coverage areas associated with the satellite 105, etc. For example, separate beam drift triggers 535 can be generated in association with different reflectors, where multiple reflectors on satellite 105 may experience independent deflection and/or otherwise may cause different groups of coverage areas to drift differently.

In some embodiments, the trigger signal output generates the beam drift trigger 535 when a difference between a first location of the coverage area computed according to the link measurement data input at a first time and a second location of the coverage area computed according to the link measurement data input at a second time indicates at least a threshold amount of drift (e.g., a threshold distance of drift, a threshold percentage change in position over a particular timeframe, a threshold number of samples indicating a position outside of nominal, etc.) between the first location and the second location. In some embodiments, the beam tracking structure 530 outputs the beam drift trigger 535 only when other criteria are also met. For example, embodiments of the beam tracking structure 530 can monitor for beam drift pattern profiles, such as periodic fluctuations, and can determine not to generate the beam drift trigger 535 when such drift pattern profiles are detected.

In one embodiment, indications of signal quality are communicated by some or all user terminals 570 presently assigned to a particular beam, and the beam tracking structure 530 receives the data as link measurement data 515. For example, the link measurement data 515 can include a set of data points, each having an associated location that indicates the location (e.g., a two-dimensional or three-dimensional location in map coordinates or any other suitable coordinates) of the user terminal 570 from which that data was received, and having an associated signal quality value that indicates a present signal quality for that user terminal 570 (e.g., measured as an instantaneous value, as a statistical average over a time window, or in any other suitable manner). In other embodiments, link measurement data 515 can be received also or alternatively be made according to measurements made at some or all gateway terminals 560, at one or more ground controllers, and/or in any other suitable manner. Further, the measurements used for link measurement data 515 can include uplink and/or downlink signal quality measurements, forward-link and/or return-link signal quality measurements, and/or any other suitable measurements.

The beam tracking structure 530 can use the link measurement data 515 to estimate a present coverage area for that beam, for example, by fitting an oval or other suitable shape to those of the set of data points that correspond to ground terminals (e.g, user terminals 570 and/or gateway terminals 560) experiencing at least some threshold magnitude of signal quality. The estimated present coverage area can be compared with a stored nominal coverage area for that spot beam (e.g., to determine a present deviation from nominal), compared with a last recorded coverage area for that spot beam (e.g., to determine a change since the last measurement), compared with a last series of recorded coverage areas for that spot beam (e.g., to determine a drifting trend), etc. Rather than estimating a present coverage area by fitting a shape, some embodiments can track differential changes in sets of ground terminals to detect triggering of drift profiles. For example, if a particular user terminal 570 (e.g., or group of user terminals 570) located near an eastern boundary of a coverage area begins to experience signal quality degradation, and another particular user terminal 570 (e.g., or group of user terminals 110) located just near a western boundary of the same coverage area concurrently begins to experience improved signal quality, the beam tracking structure 530 may determine this as an indication that the coverage area (and the associated spot beam) is drifting toward the west. In another embodiment, the beam tracking structure 530 can use link measurement data 515 from across multiple coverage areas to develop a geographically wider basis for estimating beam drift. For example, changes in signal quality across a statistical sampling of user terminal 570 locations and/or gateway terminal 560 locations distributed over the entire satellite 105 coverage area can manifest certain patterns that indicate deflection of one or more reflectors, changes in overall satellite 105 attitude (e.g., azimuth and/or elevation, etc.), and/or other changes; which can be used by the beam tracking structure 530 to estimate beam drift.

Embodiments of the terminal assignment structure 520 can include a trigger signal input coupled with the beam trigger output. The terminal assignment structure 520 can also include an assignment signal output that includes beam assignment change messages that indicate a beam reassignment of each of an identified set of ground terminals from a respective presently assigned spot beam to a respective reassigned spot beam. The beam assignment change messages can indicate one or more updates to the beam assignment map 525 computed (e.g., in response to detecting the beam drift trigger 535 at the trigger signal input) to at least partially counteract signal quality degradation of the identified set of ground terminals resulting from the present drifting. For example, the reassignment can be determined to provide improved signal strength, signal-to-noise ratio, carrier-to-interference ratio, carrier-to-interference-plus-noise ratio, packet error and/or loss data, spectral efficiency, higher bits per Hertz, and/or any other suitable criterion for signal quality improvement. The terminal assignment structure 520 can identify the set of ground terminals to reassign in various ways. The identification can be based on the set of ground terminals determined by the beam tracking structure 530 according to the link measurement data 515 to be presently experiencing at least a threshold amount of degradation in signal quality (a "presently degraded set" of ground terminals). For example, the link measurement data 515 can be received from all ground terminals, such that a present signal quality level for each ground terminal can be directly measured or otherwise directly determined. Alternatively, the beam position data 515 can be received only from a designated subset of ground terminals (e.g., a predetermined statistical sampling, or the like), and present signal quality of other ground terminals can be estimated according to their proximity (and/or any other suitable similarity) to those of the designated subset.

In some embodiments, all the presently degraded set of ground terminals are identified as reassignment candidate ground terminals 110. For example, for each of the reassignment candidate ground terminals, the terminal assignment structure 520 can identify one or more candidate reassignment beams (different from that ground terminal's presently assigned beam) and can compute a predicted change in signal quality if the reassignment candidate ground terminal were reassigned to that candidate reassignment beam. Each reassignment candidate ground terminal can be reassigned if one of the reassignment candidate beams is predicted to provide improved signal quality (e.g., or only if predicted to provide at least a predetermined threshold level of signal quality improvement). If the terminal assignment structure 520 determines that multiple reassignment candidate beams would provide service improvements, one can be selected in any suitable manner. For example, the one providing the maximum improvement can be selected for reassignment, one can be selected based on a beam drift trend (e.g., if it is determined that beams are drifting eastwardly, a reassignment candidate beam to the east of the presently assigned beam can be more heavily weighted for selection), one can be selected according to beam groupings (e.g., a set of geographically proximate, or otherwise similar, ground terminals can be analyzed as a group to determine which reassignment candidate beam would provide a maximum improvement in signal quality to the entire set), one can be selected according to present beam loading (e.g., preference can be given to reassignment candidate beams presently having more unused capacity), etc.

In other embodiments, only a portion of the presently degraded set of ground terminals is identified as reassignment candidate ground terminals. For example, all the presently degraded set of ground terminals may initially be identified as reassignment candidate ground terminals, and that initial identified set can be culled based on one or more factors; or the initial identification of reassignment candidate ground terminals can account for one or more factors. As one such factor, it may be determined for a particular reassignment candidate ground terminal that reassignment to a new beam would not provide sufficient, or even any, improvement in signal quality. In such a case, some embodiments can still reassign the ground terminal to a new beam (e.g., for algorithmic simplicity, for the sake of maintaining a beam grouping with the ground terminal and other ground terminals that may be reassigned, or for any other suitable reason), while other embodiments can determine not to reassign the ground terminal. As another such factor, a stickiness factor can be applied to limit how often a particular ground terminal can be reassigned. For example, upon reassignment of a ground terminal, a timer can be triggered, and any subsequent reassignment of that ground terminal can be prevented until a predetermined amount of time has elapsed (e.g., or, in some cases, if a higher threshold level of service degradation is determined for that ground terminal than the typical threshold used for reassignment). As yet another such factor, some ground terminals (e.g., older terminals) may only be capable of communicating with a fixed polarization orientation, such that certain types of reassignment may not be permitted (e.g., to a beam operating in a different polarization). As another factor, reassignment computations can account for higher-level communications schemes of the satellite communications system. For example, reassignment of ground terminals may impact beam switching schemes, satellite-switched time-division multiple access (SS-TDMA) protocols, or the like; and the terminal assignment structure 520 can account for such schemes in computing reassignments. As another factor, reassignments can consider current usage of beam resources by ground terminals. For example, reassignment can account for whether a user terminal 110 is in the middle of streaming media, is interacting with adaptive bitrate content, is using a real-time application protocols (e.g., voice over internet protocol (VoIP), online gaming, etc.), etc. And another factor, reassignment can account for power control considerations. For example, reassignment computations can seek to improve spectral efficiency by maximizing bits per hertz in a manner that optimizes power levels across beams (e.g., maintains power control at a desired, non-maximum level).

In some embodiments, the reassignment candidate ground terminals are identified according to the presently degraded set of ground terminals 110, but may include some, all, or even additional ground terminals. For example, the presently degraded set of ground terminals can be used to generate the beam drift trigger 535, which can trigger computations by the terminal assignment structure 520 of beam reassignments. The computations can involve various types of optimizations directed to maximize and/or minimize particular network characteristics at any suitable level (e.g., over the entire satellite 105, over an entire communication system that includes the satellite 105, over one or more particular beams, over one or more groups of ground terminals, etc.). For example, an optimization computation can seek to maximize average signal quality across the entire network of ground terminals while minimizing the number of ground terminals that are reassigned. Alternatively, an optimization computation can seek to maximize consumer satisfaction, for example, by preferentially reassigning those ground terminals that are presently consuming infrastructure resources (e.g., the user terminals 110 of users presently streaming media, downloading files, etc.).

Some embodiments of the terminal assignment structure 520 include a beam loading monitor 522 that has a stored beam load balancing schema and maintains a present loading of a set (e.g., some or all) of the spot beams with respect to the beam load balancing schema. For example, at any particular time, each beam is allocated a certain amount of infrastructure resources (e.g., bandwidth), and a certain percentage of those allocated resources is being consumed to service user terminals 110 in the coverage area of that beam. The amount of beam resources being used to service user terminals 110 (e.g., the loading of a beam) can be impacted by the number of user terminals 110 being serviced by the beam, the amount of present and future demand for beam resources from those user terminals 110, the communications schemes being used by those user terminals (e.g., different communications protocols, modulation and/or coding schemes, and/or the like can impact bandwidth consumption), etc. Reassignment of user terminals 110 from presently assigned beams to reassigned beams can impact the loading of both the presently assigned and the reassigned beams. Accordingly, some embodiments of the terminal assignment structure 520 compute the beam assignment map 525 in compliance with the beam load balancing schema according to present loading, as indicated by the beam loading monitor 522. In some embodiments, after identifying reassignment candidate user terminals 110 and determining candidate reassignment beams, the terminal assignment structure 520 can compute an optimized beam reassignment that seeks to improve (e.g., maximize) signal quality for at least some of the presently degraded set of user terminals 110, while maintaining, or even improving, loading of presently assigned and candidate reassignment beams. In some such embodiments, some user terminals 110 not identified as part of the presently degraded set may still be reassigned for the purpose of improving load balancing in context of reassigning other user terminals that are part of the presently degraded set.

In some embodiments, the network data output of the communications interface structure 510 includes (e.g., indicates) the assignment signal output in response to, or otherwise in association with, the network data input communicating link measurement data (e.g., beam position data 515) to the link measurement data input of the beam tracking structure 530. For example, the communications interface structure 510 can receive beam position data 515. The beam tracking structure 530 can communicate the beam drift trigger 535 in response to detecting certain changes in the received beam position data 515. The terminal assignment structure 520 can compute and communicate beam reassignment messages in response to detecting the beam drift trigger 535. The communications interface structure 510 can output the beam reassignment messages to the gateways 560 via the ground network 550, and/or to the user terminals 110 via the gateways 560 and the satellite 105. And each affected ground terminal can adjust its communications settings to communicate via its newly assigned spot beam in response to the beam assignment change messages. Some embodiments can use various techniques to increase efficiency of reassignment to new beams. For example, reassigning a user terminal 110 that is part of a multicast group can potentially cause an interruption in service, delay in reassignment, or have other impacts. In such a case, some embodiments can pre-allocate multicast group resources (e.g., defining carrier identifiers, multicast flow identifiers, control channel addresses, data channel addresses, etc.) to the reassigned beam in advance of directing the user terminal 110 to change its communication settings, thereby permitting a smoother reassignment. Other embodiments address similar concerns by maintaining stateful connectivity between the user terminals 110 and the satellite 105.

In some embodiments, the communications interface structure 510 includes, or is in communication with, one or more network servers 512. Some embodiments of the network server(s) 512 operate to maintain a beam-agnostic network identifier associated with each of the set of user terminals 110, so as to preserve stateful connectivity between the each of the set of user terminals 110 and the satellite 105 when implementing the beam reassignment according to the beam assignment change messages. For example, one embodiment uses a location-independent Internet Protocol (IP) address (e.g., a "mobile IP" address, or the like) for routing datagrams over the network, such that each user terminal 110 is identified on the network by a home address without regard for a current beam assignment. Such an embodiment can include assigning each user terminal 110 both a home address and a "care-of" address, which can effectively maintain stateful connectivity (e.g., maintain transmission control protocol (TCP) connections) between each user terminal 110 and the network via a proxy agent, or other such network middle-man. Another type of embodiment can use a network agent, such as a split TCP performance-enhancing proxy (PEP). The TCP splitting can break end-to-end connections between user-terminals 110 and the network into multiple sub-connections, and each sub-connection can be configured separately for desired data transfer characteristics (e.g., to address TCP window size concerns in context of long satellite round-trip times). In such embodiments, some of the sub-connections can be customized to maintain stateful connectivity.

Figure 6:
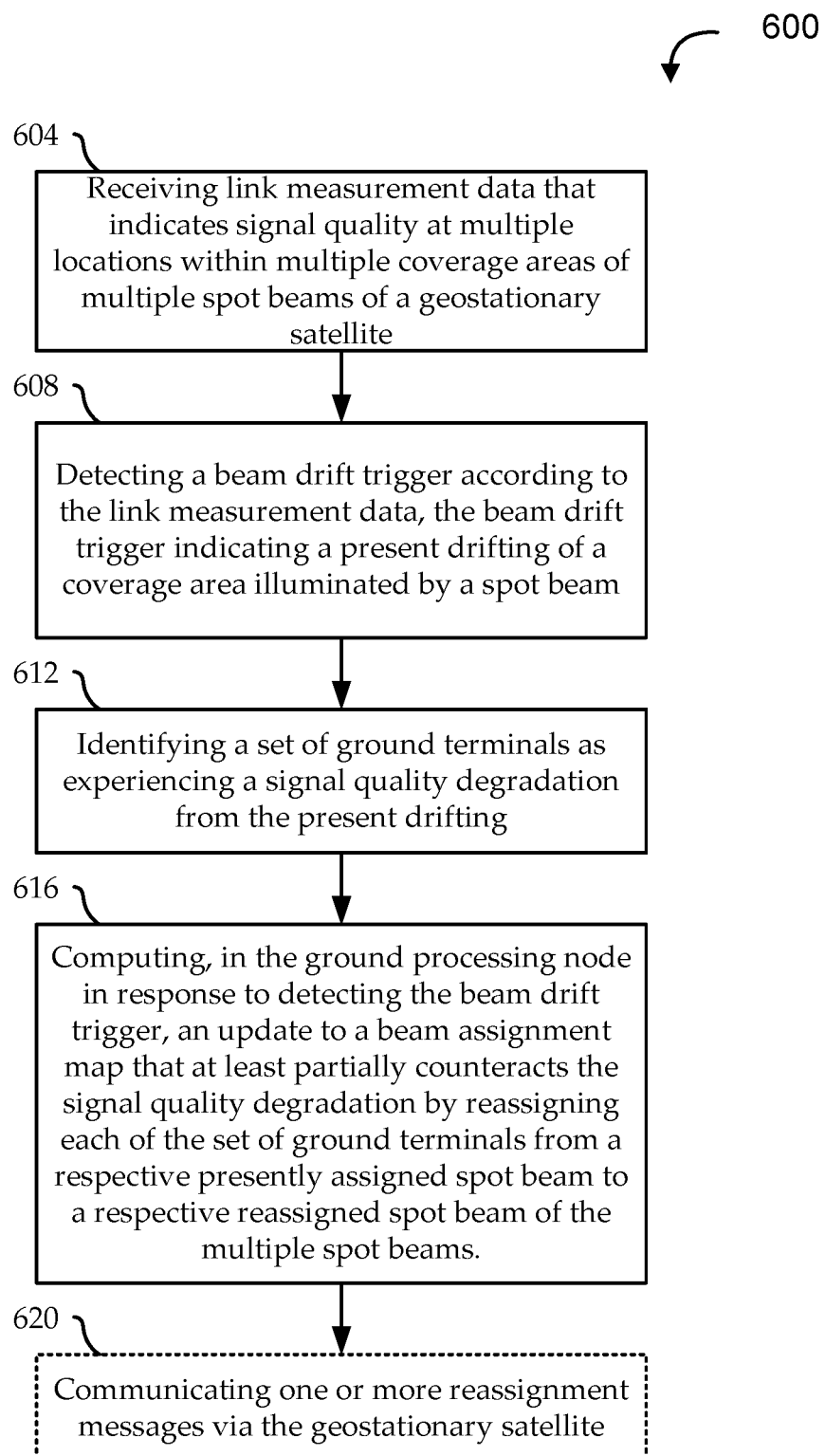
FIG. 6 shows a flow diagram of an illustrative method dynamic beam assignment in a geostationary satellite communications network, according to various embodiments.

FIG. 6 shows a flow diagram of an illustrative method 600 for dynamic beam assignment in a geostationary satellite communications network, according to various embodiments. Embodiments of the method 600 can be performed using the systems described with reference to FIGS. 1-5, or other suitable systems. Embodiments of the method 600 begin at stage 604 by receiving link measurement data that indicates signal quality at multiple locations within multiple coverage areas of multiple spot beams of a geostationary satellite. As described above, the link measurement data can be received from some or all user terminals, from multiple gateway terminals or other access nodes, from multiple ground controllers, etc.

At stage 608, embodiments can detect a beam drift trigger according to the link measurement data. The beam drift trigger can indicate a present drifting of a coverage area illuminated by a spot beam of the satellite. For example, the beam drift trigger can indicate that one or more beams has drifted by at least a threshold distance, that present drifting of one or more beams is predicted to exceed a threshold amount within some near-term timeframe, that drifting of one or more beams has increased by a certain amount over a timeframe (e.g., based on integration of recent historical data, etc.), etc. Further, the beam drift trigger can be detected independently for each of multiple reflectors, when the physical satellite architecture allows for independent deflection of reflectors, or the like. In some embodiments, the receiving at stage 604 includes receiving first link measurement data at a first time and receiving second link measurement data at a second time subsequent to the first time; and the detecting at stage 608 includes computing a first location of the coverage area at the first time according to the first link measurement data, computing a second location of the coverage area at the second time according to the second link measurement data, and computing at least a threshold amount of drift between the first location and the second location.

At stage 612, embodiments can identify a set of ground terminals as experiencing a signal quality degradation from the present drifting. As described above, the identified set of ground terminals can be some or all of the ground terminals experiencing such degradation. For example, in some embodiments, the receiving at stage 604 includes receiving first link measurement data at a first time from multiple ground terminals geographically distributed across at least the coverage area, and receiving second link measurement data from the multiple ground terminals at a second time subsequent to the first time; the detecting at stage 608 includes modeling drift of the coverage area by comparing the second link measurement data with the first link measurement data to determine a magnitude of change in signal quality for at least some of the multiple ground terminals; and the identifying at stage 612 includes identifying the set of ground terminals to comprise the subset of the multiple ground terminals for which the determined magnitude of change in signal quality of service indicates at least a predetermined threshold degradation in signal quality. In some embodiments, the identifying at stage 612 can further include identifying characteristics of the ground terminals, such as identifying location data (e.g., geolocation data, etc.), magnitude of service degradation (e.g., or present signal quality, etc.), and/or any other suitable characteristics. In some embodiments, the set of ground terminals is further identified according to the same or different characteristics. For example, the set of ground terminals can be identified as those experiencing a threshold amount of service degradation and also located within a particular geographic region and also presently consuming bandwidth.

At stage 616, embodiments can compute, in the ground processing node in response to detecting the beam drift trigger at stage 608, an update to a beam assignment map that at least partially counteracts the signal quality degradation by reassigning each of the set of ground terminals from a respective presently assigned spot beam to a respective reassigned spot beam of the multiple spot beams of the satellite. As described above, in some cases, the reassigned set of ground terminals includes some or all of the ground terminals identified as experiencing a service degradation from the present drifting, and the reassigned set of ground terminals can also include other ground terminals identified for reassignment based on other factors (e.g., maintaining a desired beam loading profile, etc.). In some embodiments, the set of ground terminals is further identified at stage 612 as those presently assigned to the at least one spot beam according to the beam assignment map. In some embodiments, the computing at stage 616 includes, for each of the set of ground terminals, assigning the ground terminal to the respective reassigned beam, such that the respective reassigned spot beam is determined to provide a higher signal quality than the respective presently assigned spot beam according to the received link measurement data. In other embodiments, the computing includes determining a present loading of a set of the spot beams with respect to a beam load balancing schema, and updating the beam assignment map further in compliance with the beam load balancing schema according to the present loading.

Some embodiments of the method 600 further include communicating one or more reassignment messages via the satellite at stage 620. In some embodiments, the reassignment message(s) instruct the set of ground terminals to update their communications settings according to the updated beam assignment map while maintaining stateful connectivity with the satellite. The communicating at stage 620 can include multicasting the reassignment message to at least the set of ground terminals. The reassignment message can indicate any suitable information for reassignment of the ground terminals, such as, for each of the set of ground terminals, indicating a respective update to at least one of the carrier frequency, polarization orientation, beam group identifier being used by the user terminal to communicate with the satellite, etc.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a non-transitory computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for dynamic beam assignment in a geostationary satellite communications network, the method comprising:
   receiving link measurement data that indicates signal quality at a plurality of locations within a plurality of coverage areas illuminated by a plurality of spot beams of a geostationary satellite;
   detecting a beam drift trigger according to the link measurement data, the beam drift trigger indicating a present drifting of a coverage area of the plurality of coverage areas illuminated by a spot beam of the plurality of spot beams of the geostationary satellite;
   identifying a set of ground terminals as experiencing a signal quality degradation from the present drifting; and
   computing, in a ground processing node in response to detecting the beam drift trigger, an update to a beam assignment map that at least partially counteracts the signal quality degradation by reassigning each of the set of ground terminals from a respective presently assigned spot beam to a respective reassigned spot beam of the plurality of spot beams.

2. The method of claim 1, wherein the identifying further comprises identifying the set of ground terminals as presently assigned to the spot beam of the plurality of spot beams according to the beam assignment map.

3. The method of claim 1, wherein the identifying further comprises identifying the set of ground terminals according to geolocation data associated with each of the set of ground terminals.

4. The method of claim 1, wherein:
   the receiving comprises receiving first link measurement data at a first time and receiving second link measurement data at a second time subsequent to the first time; and
   the detecting comprises computing a first location of the coverage area at the first time according to the first link measurement data, computing a second location of the coverage area at the second time according to the second link measurement data, and computing at least a threshold amount of drift between the first location and the second location.

5. The method of claim 1, wherein:
   the receiving comprises:
      receiving first link measurement data at a first time from a plurality of ground terminals geographically distributed across at least the coverage area; and
      receiving second link measurement data from the plurality of ground terminals at a second time subsequent to the first time;
   the detecting comprises modeling drift of the coverage area by comparing the second link measurement data with the first link measurement data to determine a magnitude of change in quality of service for at least some of the plurality of ground terminals; and
   the identifying comprises identifying the set of ground terminals to comprise the at least some of the plurality of ground terminals for which the determined magnitude of change in quality of service indicates at least a predetermined threshold degradation in quality of service.

6. The method of claim 1, wherein:
   the computing comprises, for each of the set of ground terminals, assigning the ground terminal to the respective reassigned spot beam, such that the respective reassigned spot beam is determined to provide a higher spectral efficiency than the respective presently assigned spot beam according to the received link measurement data.

7. The method of claim 1, wherein:
   the computing comprises determining a present loading of a set of the spot beams with respect to a beam load balancing schema; and
   the computing updates the beam assignment map further in compliance with the beam load balancing schema according to the present loading.

8. The method of claim 1, further comprising:
   communicating, via the geostationary satellite, a reassignment message instructing the set of ground terminals to update their communications settings according to the updated beam assignment map.

9. The method of claim 8, wherein communicating the reassignment message comprises multicasting the reassignment message to at least the set of ground terminals, the reassignment message indicating, for each of the set of ground terminals, a respective update to at least one of a carrier frequency, polarization orientation, or beam group identifier being used by the ground terminal to communicate with the geostationary satellite.

10. The method of claim 8, wherein the reassignment message instructs the set of ground terminals to update their communications settings according to the updated beam assignment map while maintaining stateful connectivity with the geostationary satellite.

11. The method of claim 10, wherein each of the set of ground terminals is associated with a network identifier that is beam agnostic, such that maintaining stateful connectivity with the geo stationary satellite comprises maintaining the association of each of the set of ground terminals with its network identifier when its communications settings are updated.

12. The method of claim 1, wherein:
the beam drift trigger indicates the present drifting in association with one of a plurality of reflectors of the geostationary satellite, each of the plurality of reflectors focusing a respective portion of the plurality of spot beams of the geostationary satellite.

13. The method of claim 1, wherein the set of ground terminals includes at least one user terminal.

14. The method of claim 1, wherein the set of ground terminals includes at least one gateway terminal.

15. A system for dynamic beam assignment in a geostationary satellite communications network, the system comprising:
a data store having a beam assignment map stored thereon;
a beam tracking structure having:
a link measurement data input; and
a trigger signal output that comprises a beam drift trigger when the link measurement data input indicates a present drifting of a coverage area illuminated by a spot beam of a plurality of spot beams of a geostationary satellite; and
a terminal assignment structure having:
a trigger signal input coupled with the trigger signal output; and
an assignment signal output that comprises a plurality of beam assignment change messages according to an update to the beam assignment map computed, in response to the trigger signal input, to at least partially counteract signal quality degradation of an identified a set of ground terminals resulting from the present drifting, the beam assignment change messages indicating a beam reassignment of each of the set of ground terminals from a respective presently assigned spot beam to a respective reassigned spot beam of the plurality of spot beams.

16. The system of claim 15, further comprising:
a communications interface structure coupled with the beam tracking structure and the terminal assignment structure, and having a network data input and a network data output communicatively couplable with the geostationary satellite via a ground network,
wherein the network data output comprises the assignment signal output in response to the network data input communicating link measurement data to the link measurement data input.

17. The system of claim 16, wherein the communications interface structure comprises:
a network server that operates to maintain a beam-agnostic network identifier associated with each of the set of ground terminals so as to preserve stateful connectivity between the each of the set of ground terminals and the geostationary satellite when implementing the beam reassignment according to the beam assignment change messages.

18. The system of claim 15, wherein the terminal assignment structure further comprises:
a beam loading monitor comprising a stored beam load balancing schema and maintaining a present loading of a set of the spot beams with respect to the beam load balancing schema,
wherein the beam assignment map is computed further in compliance with the beam load balancing schema according to the present loading.

19. The system of claim 15, wherein:
the trigger signal output comprises the beam drift trigger when a difference between a first location of the coverage area computed according to the link measurement data input at a first time and a second location of the coverage area computed according to the link measurement data input at a second time indicates at least a threshold amount of drift between the first location and the second location.

20. The system of claim 15, further comprising:
a ground terminal data store having stored thereon geolocation data for each of at least the set of ground terminals.

21. The system of claim 15, further comprising:
the geostationary satellite.

22. The system of claim 21, further comprising:
a plurality of satellite access ground terminals in communication with the geostationary satellite; and
a ground processing node structure coupled with the plurality of satellite access ground terminals via a ground network, the ground processing node structure comprising the beam tracking structure and the terminal assignment structure.

23. The system of claim 21, wherein:
the geostationary satellite comprises a plurality of reflectors, each focusing a respective portion of the plurality of spot beams of the geostationary satellite,
wherein the trigger signal output is generated according to independent location tracking of each of the plurality of reflectors.

24. The system of claim 15, wherein the set of ground terminals includes at least one user terminal.

25. The system of claim 15, wherein the set of ground terminals includes at least one gateway terminal.

26. A processor for dynamic beam assignment in a geostationary satellite communications network, the processor coupled with a memory having a beam assignment map stored thereon, the processor comprising:
instructions for receiving link measurement data that characterizes signal strength at a plurality of locations over a plurality of spot beams of a geostationary satellite;
instructions for detecting a beam drift trigger according to the link measurement data, the beam drift trigger indicating a present drifting of a coverage area illuminated by at least one spot beam of the plurality of spot beams;
instructions for identifying a set of ground terminals as experiencing a signal quality degradation from the present drifting; and
instructions for computing, in response to detecting the beam drift trigger, an update to the beam assignment map that at least partially counteracts the signal quality degradation by reassigning each of the set of ground terminals from a respective presently assigned spot beam to a respective reassigned spot beam of the plurality of spot beams.

27. A ground processing node of the geostationary satellite communications network having the processor of claim 26 disposed therein.

\* \* \* \* \*